United States Patent
Apostolos et al.

(10) Patent No.: US 9,432,366 B2
(45) Date of Patent: Aug. 30, 2016

(54) FINGERPRINT BASED SMARTPHONE USER VERIFICATION

(71) Applicant: AMI Research & Development, LLC, Windham, NH (US)

(72) Inventors: John T. Apostolos, Lyndeborough, NH (US); William Mouyos, Windham, NH (US); Judy Feng, Nashua, NH (US); Dwayne T. Jeffrey, Amherst, NH (US)

(73) Assignee: AMI RESEARCH & DEVELOPMENT, LLC, Windham, NH (US)

( * ) Notice: Subject to any disclaimer, the term of this patent is extended or adjusted under 35 U.S.C. 154(b) by 0 days.

(21) Appl. No.: 14/231,935

(22) Filed: Apr. 1, 2014

(65) Prior Publication Data

US 2014/0310804 A1     Oct. 16, 2014

Related U.S. Application Data

(60) Provisional application No. 61/807,113, filed on Apr. 1, 2013.

(51) Int. Cl.

| | |
|---|---|
| G06F 7/04 | (2006.01) |
| G06F 12/00 | (2006.01) |
| G06F 12/14 | (2006.01) |
| G06F 13/00 | (2006.01) |
| G06F 17/30 | (2006.01) |
| G11C 7/00 | (2006.01) |
| H04L 29/06 | (2006.01) |
| H04W 12/06 | (2009.01) |
| H04W 88/02 | (2009.01) |

(52) U.S. Cl.
CPC .......... *H04L 63/0861* (2013.01); *H04W 12/06* (2013.01); *H04W 88/02* (2013.01)

(58) Field of Classification Search
CPC .. H04L 63/0861; H04W 12/06; H04W 88/02
See application file for complete search history.

(56) References Cited

U.S. PATENT DOCUMENTS

| | | |
|---|---|---|
| 8,086,417 B2 | 12/2011 | Seguine |
| 8,566,955 B2 | 10/2013 | Brosnan |
| 8,627,096 B2 | 1/2014 | Azar et al. |
| 2005/0123177 A1* | 6/2005 | Abiko ................ G06K 9/00114 |
| | | 382/124 |

(Continued)

FOREIGN PATENT DOCUMENTS

| | | |
|---|---|---|
| WO | WO 2013/055953 A1 | 4/2013 |
| WO | WO 2013/093638 | 6/2013 |

OTHER PUBLICATIONS

Meng et al.,Touch Gestures Based Biometric Authentication Scheme for Touchscreen Mobile Phones (Information Security and Cryptology, Nov. 2012, pp. 331-350).*

(Continued)

*Primary Examiner* — Peter Poltorak
*Assistant Examiner* — Huan V Doan
(74) *Attorney, Agent, or Firm* — Cesari and McKenna, LLP

(57) ABSTRACT

A touch screen, now incorporated in most smart phones, presents an effective and transparent method to incorporate continuous active user verification schemes. The projected capacitive grid structure can be used to capture enough information to verify that a valid user currently has possession of the mobile device, even while the user is not consciously engaged in an active verification interface. Further processing, such as habitual gesture recognition, can augment the process.

14 Claims, 15 Drawing Sheets

(56) References Cited

U.S. PATENT DOCUMENTS

| | | | |
|---|---|---|---|
| 2008/0091453 A1* | 4/2008 | Meehan | G06Q 20/341 705/317 |
| 2008/0092245 A1* | 4/2008 | Alward | G06F 21/316 726/28 |
| 2008/0098456 A1* | 4/2008 | Alward | G06F 21/316 726/1 |
| 2009/0009194 A1* | 1/2009 | Seguine | 324/684 |
| 2009/0083847 A1* | 3/2009 | Fadell | G06F 21/316 726/16 |
| 2010/0225443 A1* | 9/2010 | Bayram | G06F 21/316 340/5.83 |
| 2011/0050394 A1* | 3/2011 | Zhang | G06F 3/045 340/5.82 |
| 2012/0182253 A1* | 7/2012 | Brosnan | G06F 3/0416 345/174 |
| 2013/0104203 A1 | 4/2013 | Davis et al. | |
| 2013/0159939 A1* | 6/2013 | Krishnamurthi | 715/863 |
| 2013/0307818 A1* | 11/2013 | Pope | G06F 3/044 345/174 |
| 2014/0003679 A1* | 1/2014 | Han | G06K 9/00013 382/124 |
| 2014/0066017 A1 | 3/2014 | Cho | |

OTHER PUBLICATIONS

Frank et al., Touchalytics: On the Applicability of Touchscreen Input as a Behavioral Biometric for Continuous Authentication (IEEE Transactions on Information Forensics and Security, vol. 8, No. 1, Jan. 2013).*

Meng et al., "Touch Gestures Based Biometric Authentication Scheme for Touchscreen Mobile Phones," Information Security and Cryptology, Lecture Notes in Computer Science vol. 7763, 2013, pp. 331-350.

Trewin et al., "Biometric Authentication on a Mobile Device: A Study of User Effort, Error and Task Disruption," *ACSAC'12*, Dec. 3-7, 2012, Orlando, FL, 10 pages.

Merriam-Webster's Collegiate Dictionary, Tenth Edition, p. 437 see definition of "fingerprint", copyright 1999 Merriam-Webster, Incorporated, Springfield, Massachusetts, USA.

* cited by examiner

FINGERPRINT BASED SMARTPHONE USER VERIFICATION

CROSS REFERENCE TO RELATED APPLICATIONS

This application claims the benefit of a prior co-pending U.S. Provisional Patent Application Ser. No. 61/807,113 filed Apr. 1, 2013 entitled "Fingerprint Based Smart Phone User Verification", the entire contents of which are hereby incorporated by reference.

BACKGROUND

1. Technical Field

This application relates in general to providing security in mobile electronic devices and in particular to techniques that verify authorized users via touch sensors.

2. Background Information

For some time it has been common to provide mobile devices such as smartphones, tablet computers, laptop computers and the like with various mechanisms to provide lock-unlock functions. These functions help limit use of the device, to prevent unwanted persons from gaining access. In general a mobile device will perform a lock function when a lock activation mode has been selected by an authorized user. In addition to activation at power on, a mobile device will typically also activate the lock function when there is no input from a user for a period of time.

Commonly known factors for controlling lock-unlock are the entry of passwords via a keyboard, finger swipe motions or drawing gestures on a touchscreen, sensors to detect fingerprints, facial recognition via built-in cameras, and others. It is also known to provide further security by combining two or more such factors before granting access to the device.

SUMMARY

Although there are several existing applications for mobile phones and other devices that can verify a user in order to unlock a phone, entry passwords, facial images, fingerprint "touch ID," swipe motions or even drawing sequences are a one time entry and do not continually verify the user. This is adequate for some applications, but not necessarily for others, such as a military use, where a device already in use could be taken from a soldier by an enemy.

Periodic user verification may be implemented with the same modality as the unlock feature, but at the expense of user productivity. The tradeoff between longer intervals for productivity and shorter intervals for security has no realistic optimum value. Given that these devices are typically used for computing and data communication, and not necessarily voice communication, background voice authentication is not a good omnipresent modality for this assessment. Also, since low power usage is important for field operations, periodic or background image capture for facial image authentication expends a mobile device's battery prematurely. There are also context and environmental variables such as lighting and uniform or gear changes that affect performance.

According to the teachings herein, an active authentication method and system may be based on biometric authentication modalities—"user touchscreen gestures", which are a biometric behavioral signature in one embodiment, and/or a "finger image", which is a physiological signature. The same touchscreen sensor data is used for both biometric modalities. These touchscreen sensors are already present in most smartphones, and therefore implementation does not necessarily require retrofitting additional hardware or new types of sensors.

The touchscreen, typically implemented as a grid of projected capacitive electrodes, presents an especially effective and transparent method to incorporate active user verification. The preferred solutions work actively as a background process, while the individual interacts and performs their normal work functions with the device. The projected capacitive grid structure can be used to capture enough information to continuously verify that a valid user has possession of the smartphone. As such, there is no need for the user to be actively prompted for authentication data; the user's natural finger motion itself is used instead.

Touch screens use projected capacitive grid structures where every electrode intersection can be unambiguously identified as a touch point. As the user's finger slides up and down the grid, the ridges and valleys of the finger move across these touch points, superimposing a one dimensional time-based "1-D" profile of the finger "terrain" on the low frequency mutual capacitance effect of the intersecting wires. In one example, there may be four different 1-D profiles simultaneously extracted from the four touch points overlaying the fingerprint.

A user's fingerprints are stored during initialization of the device and then correlated with the 1-D profiles for authentication.

Parameters, such as spatial and temporal coupling intervals, can vary considerably between devices. In certain embodiments, these should be about approximately 5 mm and 20 to 200 Hz, respectively. Taking into account the variable speed and location of finger movement by an individual over the touch screen provides an increased spatial and temporal sampling resolution. Therefore adequate data for both the kinematic touch stylometry and finger image can be used as a biometric modality for active user authentication.

In some embodiments, the initial authentication or unlock mechanism for the device may be any of the aforementioned factors (passwords, gestures, facial recognition, etc.). The focus here is to instead provide subsequent, active, continuous authentication based on these authentication modalities.

Optional aspects of the method and system can be based on previously proven algorithms such as pattern recognition algorithm(s). They can be optionally integrated at a higher level with known Neuromorphic Parallel Processing techniques that have functionality similar to that of the biological neuron, for a multimodal fusion algorithm. For example, 1-D finger profiles may be combined with the outputs from other mobile device sensors such as audio (voice), image, or even user kinematic position stylometry (how the user typically holds the device). This provides additional modalities for authentication without increasing mobile device processing overhead as well as minimizing power consumption. These techniques can be wholly or partially implemented in remote servers accessible via wireless network(s), or in local special purpose neuromorphic procedures.

Given the proven robustness of the algorithms, the approach works with a range of spatial sampling resolution of current pro-cap touchscreen devices and the associated temporal sampling rate of the associated processor(s) that perform the algorithms.

BRIEF DESCRIPTION OF THE DRAWINGS

The description below refers to the accompanying drawings, of which.

DETAILED DESCRIPTION OF PREFERRED EMBODIMENTS

A. Introduction

Described below are a system and method for using a touch screen, already present in most mobile devices, to provide active, continuous user authentication. The touch screen inputs provided as a user goes about normal interaction with the device provide sufficient interaction to verify that a valid user has possession of the device. The same physiological data can be combined with habitual gestures detected using the same touchscreen sensors to further authenticate the user.

B. Typical Device Architecture

Figure 1:
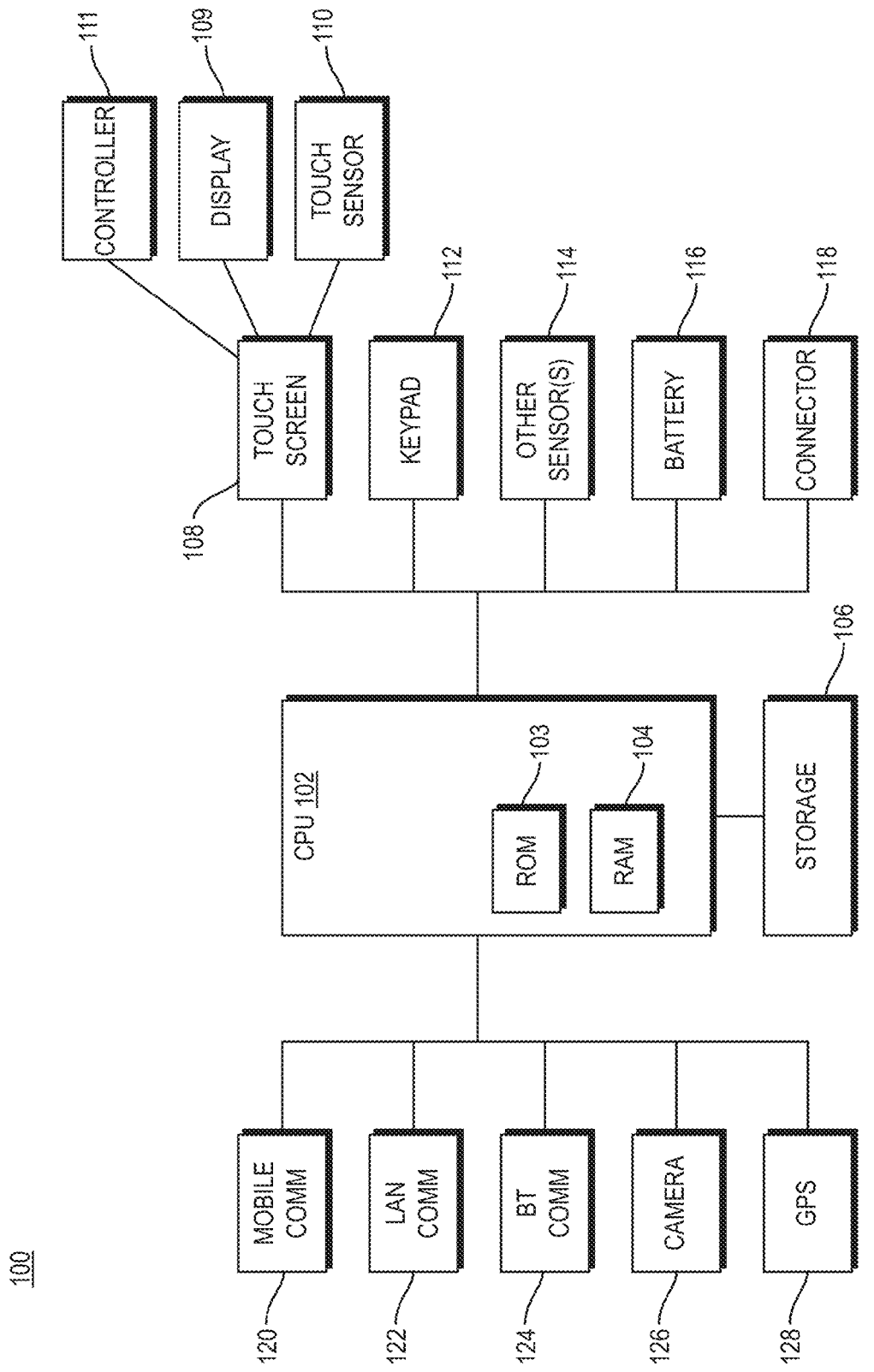
FIG. 1 is a block level diagram of the components of a typical smart phone.

FIG. 1 is a high-level block diagram of a typical device in which the methods and systems described herein may be implemented in whole or in part. Those of skill in the art will recognize the block diagram as illustrating example components of a typical smartphone, tablet, laptop computer device 100, or the like. The device 100 includes a central processing unit (CPU) 102 which may be a integrated circuit microprocessor or microcontroller. CPU 102 includes a read-only memory 103 and random access memory 104. The CPU 102 also has access to other storage 106. The CPU executes stored software programs in order to carry out the methods and to provide the system described herein.

Also part of the example device 100 are a touchscreen 108 which itself further includes a display portion 109, a touch sensor portion 110 and touchscreen controller 111. Additional components of the device 100 may include a keypad 112, other sensors such as accelerometers 114, a battery 116, and a connector 118. Additional functions and features may include a mobile network communication interface 120, a local area network communication interface 122, Bluetooth communication module 124, camera 126, Global Positioning System sensor 128 as well as other functions and features not shown in FIG. 1. What is important to the present discussion is that the device 100 includes CPU 102 and some sort of touchscreen 108 which can provide output signals to the CPU as described herein. The signals provided by the touchscreen 108 are processed according to the techniques described herein to provide additional security to the device 100 such as by granting or denying access to a user. The techniques described herein may be implemented in low-level device drivers, and/or the kernel of an operating system of the CPU 102, but may also be implemented at other hierarchical software levels.

Figure 2:
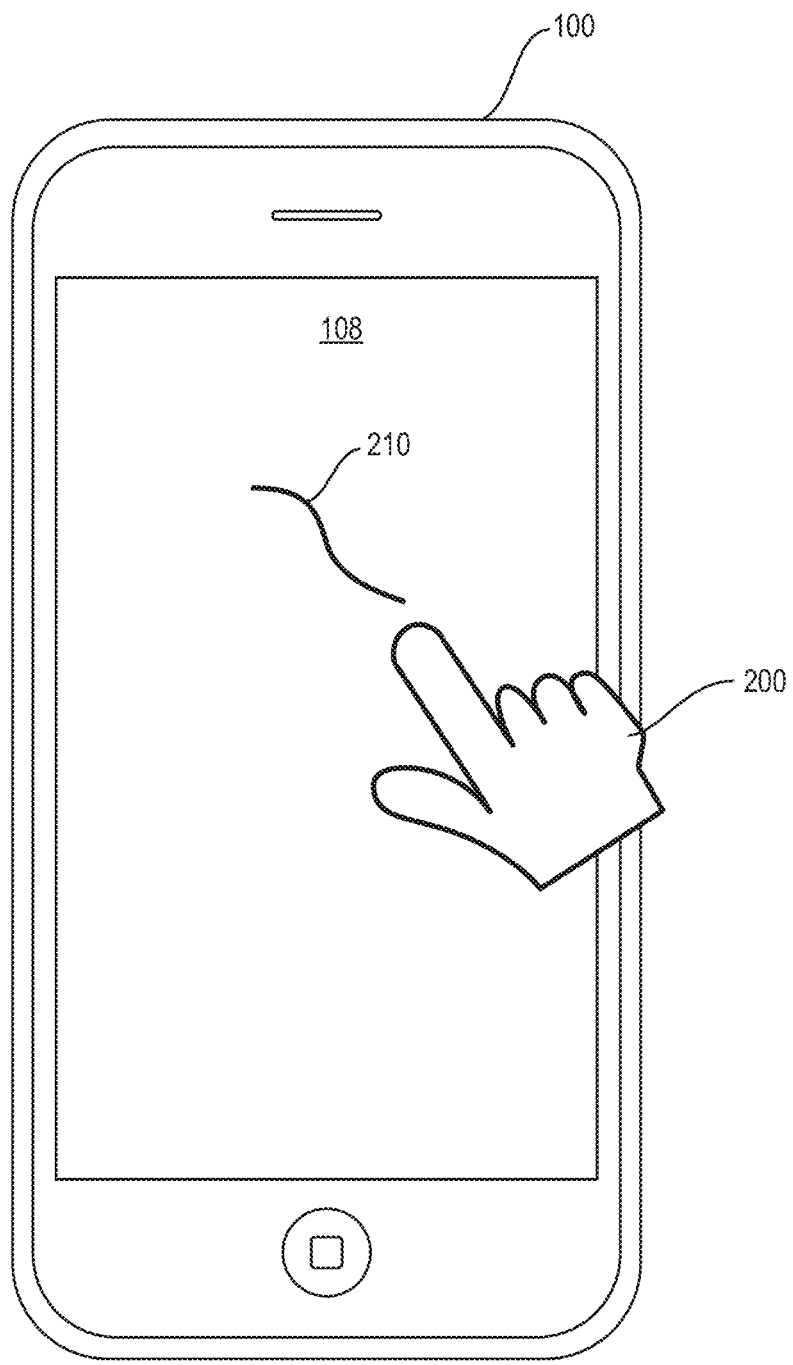
FIG. 2 is a view of a typical touch sensitive screen.

FIG. 2 is an external view of a typical smartphone device 100. The device 100 is dominated by the touchscreen 108. A user 200 is interacting with the touchscreen 108 such as by making one or more gestures 210 on the surface of the touchscreen 108 with their finger. As is known in the art these gestures 210 are detected by a touch sensor 110 and fed to the CPU 102 via controller 111.

Figure 3:
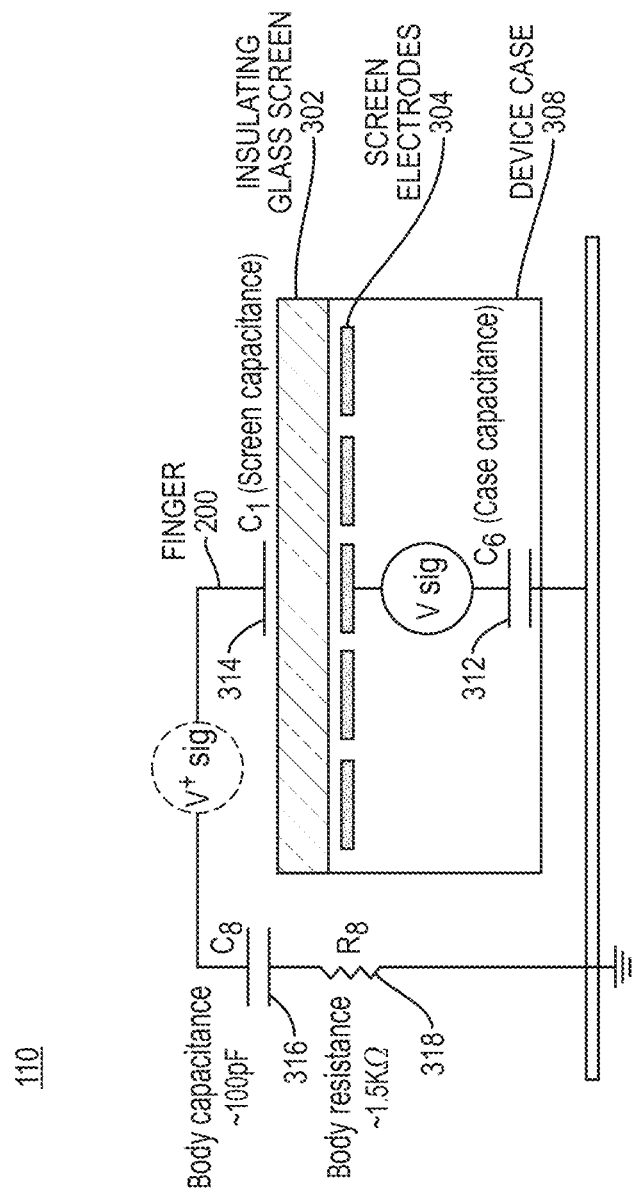
FIG. 3 is a more detailed circuit diagram of a touch sensor.

A typical touch sensor array is shown in more detail in FIG. 3. Such mutual capacitance touchscreens use projected-capacitance (pro-cap) grid structures where every electrode 304 intersection can be unambiguously identified as a touch point. In one example, the electrodes 304, arranged as grid lines, are transparent direct current (DC) conductors 0.002 inches wide with a grid line spacing of 0.25 inches. This is similar to fingerprint sweep sensors (e.g. Fujitsu MBF300) that also use capacitive sensors, albeit at a higher spatial resolution (500 dpi). In a smartphone 110, there is typically a protective cover glass lens 302 laminated to the touch screen with a thickness of 0.5 mm.

C. Epidermal Finger Pattern Recognition Via Capacitor Sensor Grid

As alluded to above, a finger "image" algorithm provides user identification from a sparse data set, sufficiently accurate for continuous user authentication. The projected capacitance touchscreen 108 presents an especially attractive and transparent method to accomplish this active user verification.

Figure 4:
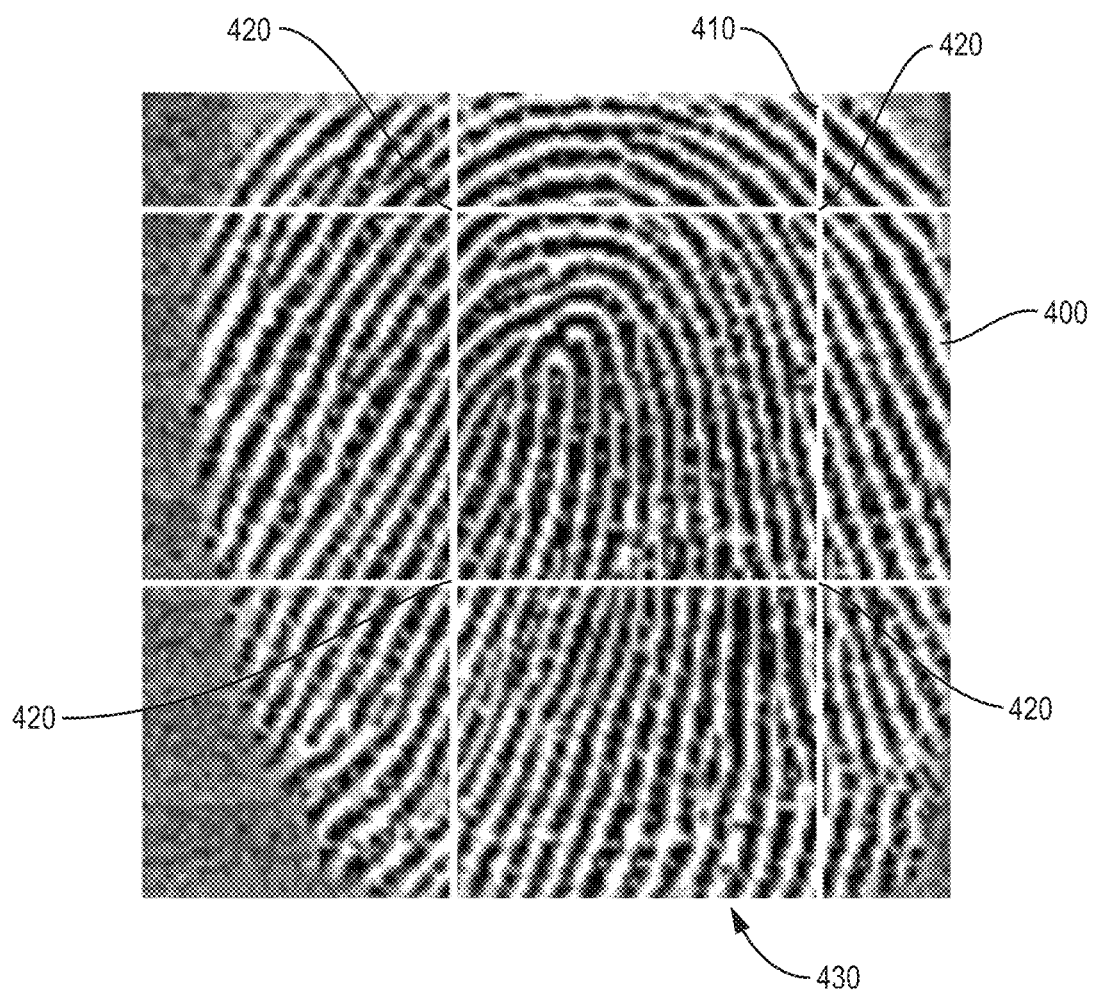
FIG. 4 illustrates touch sensor grid lines superimposed on a typical fingerprint.

More particularly, as a user's finger impedes the proximity of an electrode 304, the mutual capacitance between electrodes 304 is changed. FIG. 4 depicts an example fingerprint 400 with the capacitive grid lines 410 overlaid. In this example, the grid lines 410 are superimposed on a fingerprint 400 at four grid intersections, creating four data collection points 420. The fingerprint ridges 430 are approximately 0.5 mm wide. As the user's finger 200 slides up, down, and across the grid 410 during normal interaction with the smartphone (using application software and other functions not necessarily related to user authentication processes), the ridges and valleys of the fingerprint 400 are sensed by the difference in mutual capacitance of a ridge versus a valley in proximity to a grid collection point 420. This superimposes a one dimensional (1-D) profile in time of the "fingerprint terrain" imposed on the intersecting wires. At any given time, the finger 200 could be traversing several collection points in the grid. Each such collection point adds information to the data set, and the data set grows over time proportional to the amount of touch activity. For example, in FIG. 4 there are four different profiles simultaneously extracted from the four collection touch points 420. This can occur continuously, even when the user is not actively or consciously engaged in an authentication input session.

In one example, the projected capacitive (pro-cap) touch sensor grid is a series of transparent conductors which are monitored for a capacitance change between one another.

This change in capacitance is monitored for a series of iterations, circulating throughout the sensor grid up to for example, 200 cycles per second. This sample rate can be increased further by oversampling in the proximity of the calculated finger location, and skipping the grid sensors away from that location. The sampling function may be performed by a touch controller 111, such as the co-called PSoC chips available from Cypress Semiconductor.

The sensor grid 110 may produce a large change in capacitance with finger distance (height), even though the total capacitance is very low (total capacitance is in the picofarads range), allowing the difference between the ridge and trough on a fingerprint to be significant (measurable SNR). To verify this, a full wave FEM electromagnetic simulation was performed using Ansys HFSS, observing the change in impedance of a conductive grid line in close proximity to simulated human flesh material. The finger was assumed to have a real dielectric constant of 29 and a conductivity of 0.55 S/m. The material was moved from 25 mils (spacing when line sensor is in proximity to fingerprint valley) to 20 mils (distance to fingerprint ridge) from the sensor line, and an appreciable impedance change of 7.2% was observed due to the additional capacitance.

It should now be understood that these 1-D profiles represent information about the fingerprint of the user, but are not assembled into an actual visual image of the actual fingerprint as is done in prior fingerprint recognition. The data set instead contains many 1-D "terrain profiles" of the finger in various orientations, collected over time. This sparse data set is then correlated to a previous enrollment of the user. Data collected by the grid of sensors is compared (such as by using the techniques further described below or other correlation algorithm) to a database of previously authorized, enrolled users.

Figure 5:
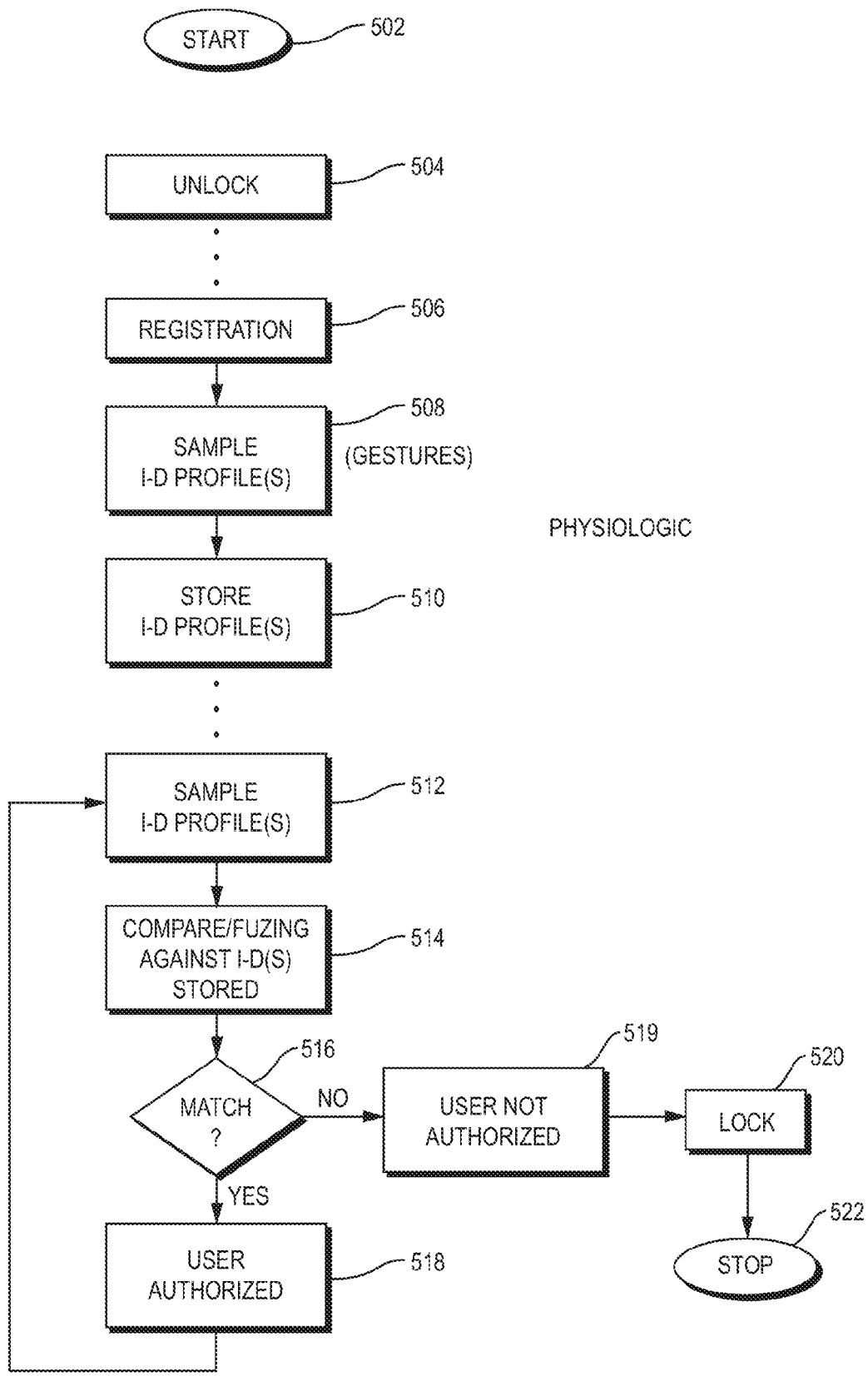
FIG. 5 is a sequence of operations performed to register and authenticate users using 1-D profiles of a physiological finger biometric attribute sensed with the capacitance grid structure of FIG. 4.

FIG. 5 is a sequence of steps that may be performed by the CPU 102 to implement active user verification using the 1-D profile spare data sets. In a first state 502 the process starts. In a next state 504 the device 100 may execute an unlock process. This may be by any of the known techniques such as a finger swipe or other gesture, entering a password, facial recognition or other technique.

At this point the user is initially known to be authorized to access the device 100 and a registration state 506 may be subsequently entered. From this state 506 one or more 1-D profile data sets are taken from the user. These samples are indicative of the user's fingerprint profile and will be used in later continuous authentication. One or more of the 1-D profiles are taken for example by collecting data from the four data collection points 420 discussed above, while the user is prompted to interact with the touchscreen. The data taken from the four collection points 420 is then stored as a set of 1-D profiles. One or more of these 1-D profiles may be taken in this registration mode.

Registration mode then ends and the CPU then proceeds to allow the user to perform other functions such as normal activities that the user would perform with their device 100. For example the user may execute application programs, games, make telephone calls, interact with the devices' operating system, and the like all interacting via the touchscreen. During this "normal activity" state a number of continuous authentication steps are taken preferably via a background process. In particular, 1-D profiles are taken in state 512 from the same set of touch points 420 as used for registration. In state 514 these are then compared against the previously stored 1-D profiles. If in, state 516, there is a match, then the user is retained in the authorized state 518 and processing can then proceed. The user thus has been verified as being an authorized user. However, if in state 416 there is not a sufficient match, a state 518 may be entered with the user no longer being authorized. This state may be entered only after only a single mismatch, or may be entered only after several mismatches are seen. From state 518, since the current user of the device has been detected as not being authorized, the device may enter a lock mode 520 which shuts down or otherwise stops further access in state 522.

Figure 6:
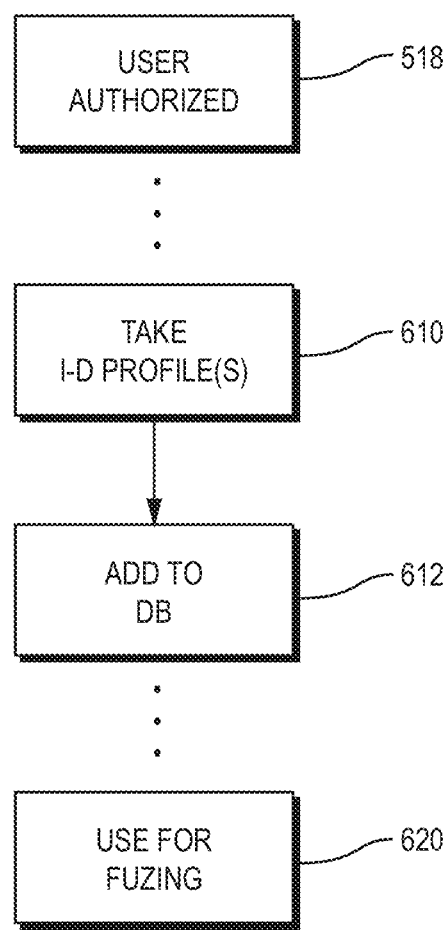
FIG. 6 is an example sequence of events for sensing additional 1-D profiles.

FIG. 6 shows a sequence of optional steps which the system may perform when the user authorized state 518 is active. For example, the system may take additional 1-D profiles. In state 610 these additional profiles may be used not just for continuous further authentication of the user but may be stored in the memory that is added to the 1-D profile database. These additional samples are then used for further matching in state 620 as further described below.

Figure 7:
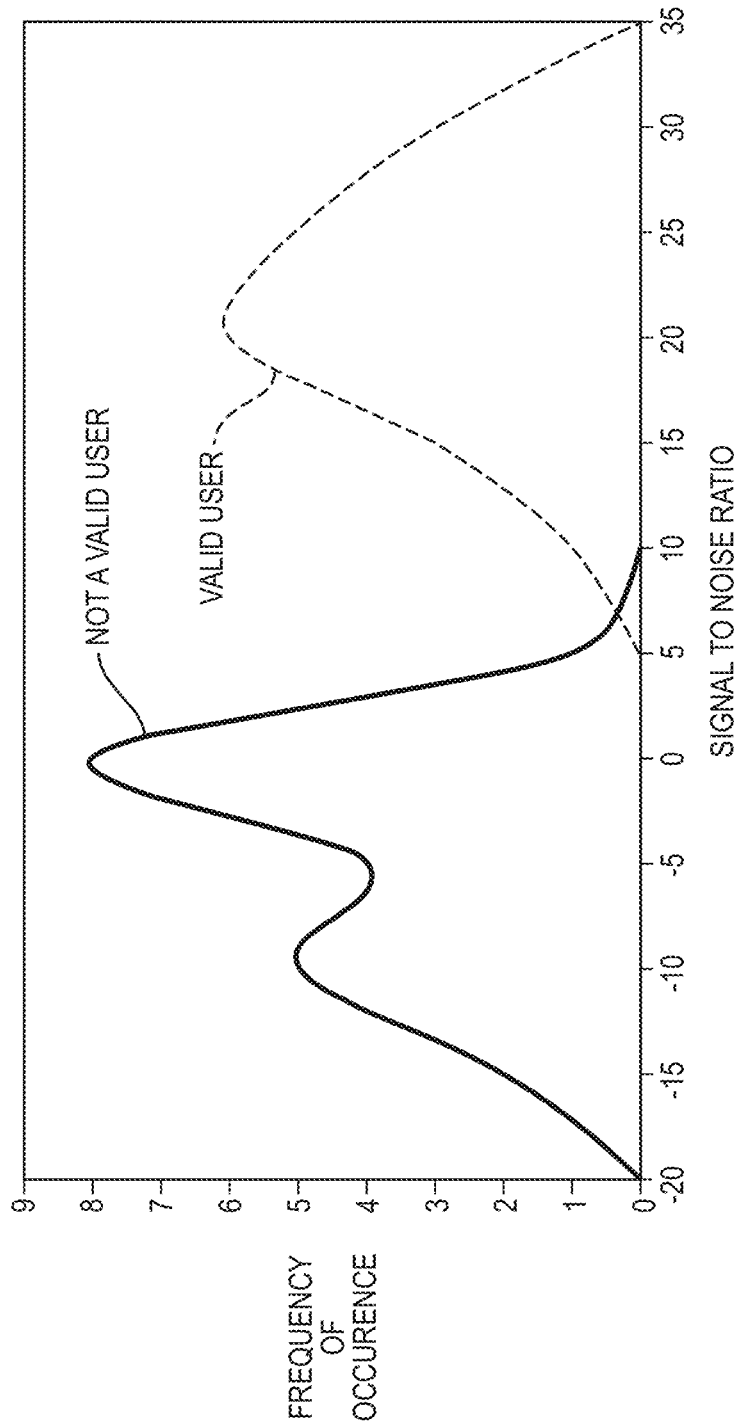
FIG. 7 is an example authentication decision diagram.

In order to assess the viability of the method with these expected sparse data sets, a set of previously obtained 1-D profiles were sampled via simulation and data input into a C-code model. FIG. 7 shows the resulting signal to noise ratio (related to a correlation factor by Equation (1) below) for a set of valid users and invalid users.

$$\text{Correlation Coefficient} = \frac{1}{\sqrt{1 + \frac{1}{S/N^2}}} \quad \text{(Equation 1)}$$

Figure 8:
FIG. 8 is a typical sparse fingerprint sample used in simulating the detection algorithm.

The results were a signal to noise (SNR) output when a sparse piece of fingerprint information was compared to a database of forty (40) National Institute of Standards and Technology (NIST) fingerprints. Half were considered authorized users, and the other half non-authorized. The sparse fingerprint information used in this example was a 0.1 inch wide strip of a fingerprint image as shown in FIG. 8.

FIG. 7 shows the results of running the 40 fingerprints through the verification simulation. The distributions for the valid users and the invalid users are separated such that both false acceptance and false rejection rates is expected to be low. The low end tail of the valid user distribution is caused by three finger prints known to be smudged in the test group. While the simulation results were accomplished using the two-dimensional strip of FIG. 8 the actual profile generated by the touch points can be a set of 1-D profile measurements.

In fact there would be a multitude of 1-D profiles generated by the touch screen, available to be fused together, using the techniques discussed further below. As per FIG. 6, the number of these 1-D profiles will grow as the user continues to use the device by several dozen per second, depending on rate of touch. Each additional data set may be used to increase the confidence of identification when fused together.

D. Habitual Gesture (Kinematic) Recognition

An active kinematic gesture authentication algorithm may also use the same 1-D profile data sets derived from the same touchscreen 108 sensors. It is designed to derive general biometric motion and compensates for variability in rate, direction, scale and rotation. It can be applied to any time series set of motion detected by the capacitive grid. The preferred implementation is intended for personal signature authentication using the repeated swiping motions on the touchscreen. Touchscreen gestures provide point samples for position, rate, pressure (spot size) and amplitude samples from each sensor point 420 within the spot size. A kinematic authentication algorithm then compares these and other features against known user characteristics and provides a probability of error.

Figure 9:
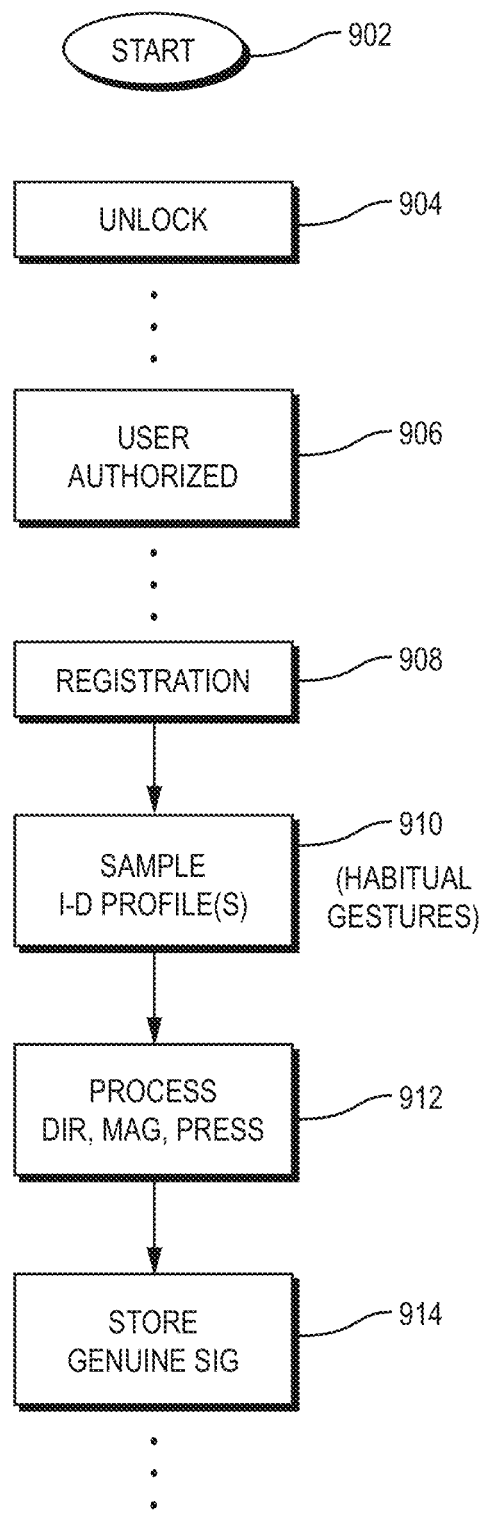
FIG. 9 is a sequence of operations performed to register a user with biometric behavioral or other habitual gesture such as a handwritten signature.
Figure 10:
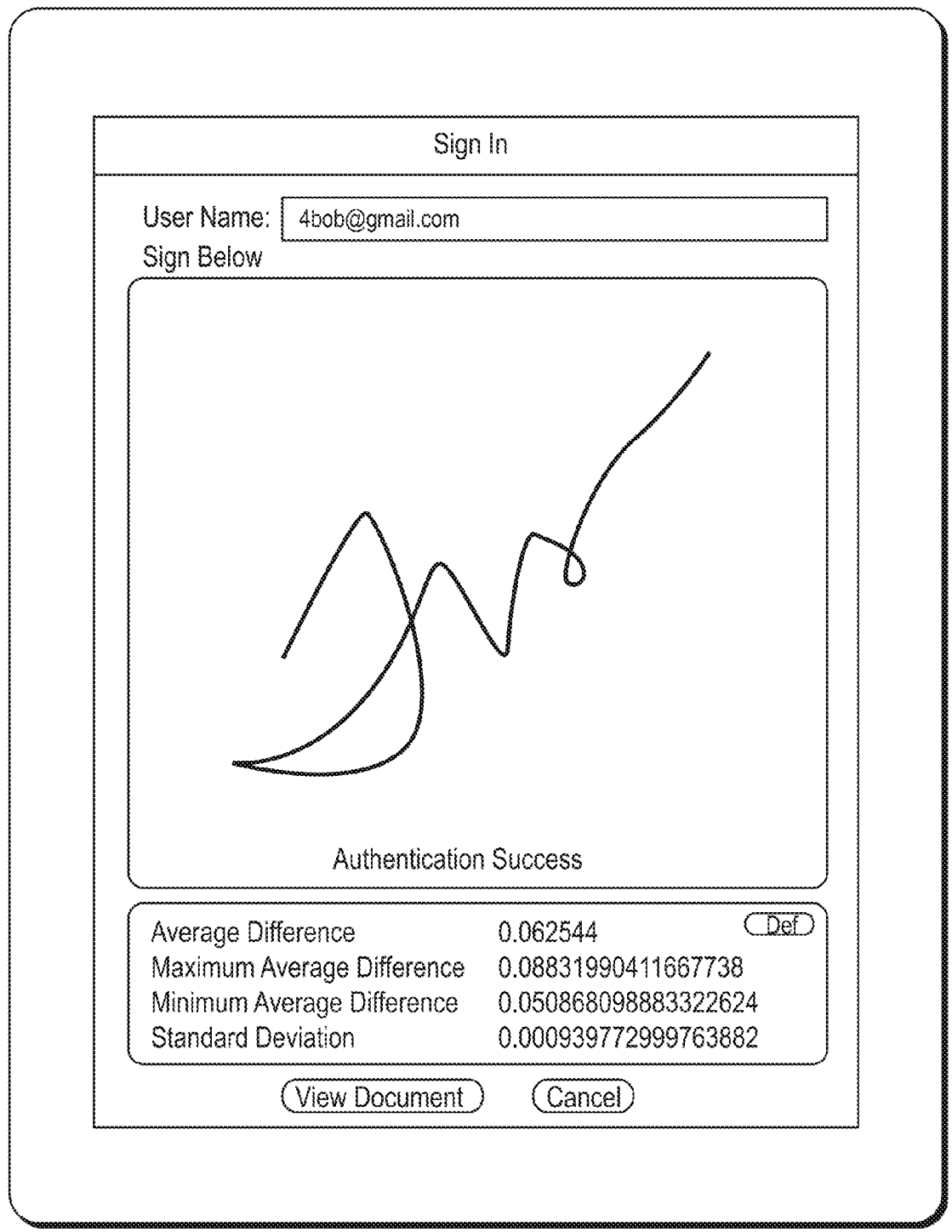
FIG. 10 is a typical enrollment screen.

FIG. 9 shows a signature registration process. From a start state 902 the device 110 may next perform an unlock sequence 904. Eventually a state 906 is reached in which the user is known to be authorized. State 908 is then entered in which a registration process proceeds. The user may be presented with a screen, such as that shown in FIG. 10, where the user is prompted to perform a kinematic gesture, preferably a habitual gesture such as a signature. In state 910, 1-D profiles from the sensor array are sampled and stored of this kinematic gesture. The samples are then processed to determine direction, magnitude pressure and potentially other attributes of the habitual gesture in state 912. In state 914 this information is then stored as that user's genuine signature profile.

Figure 11:
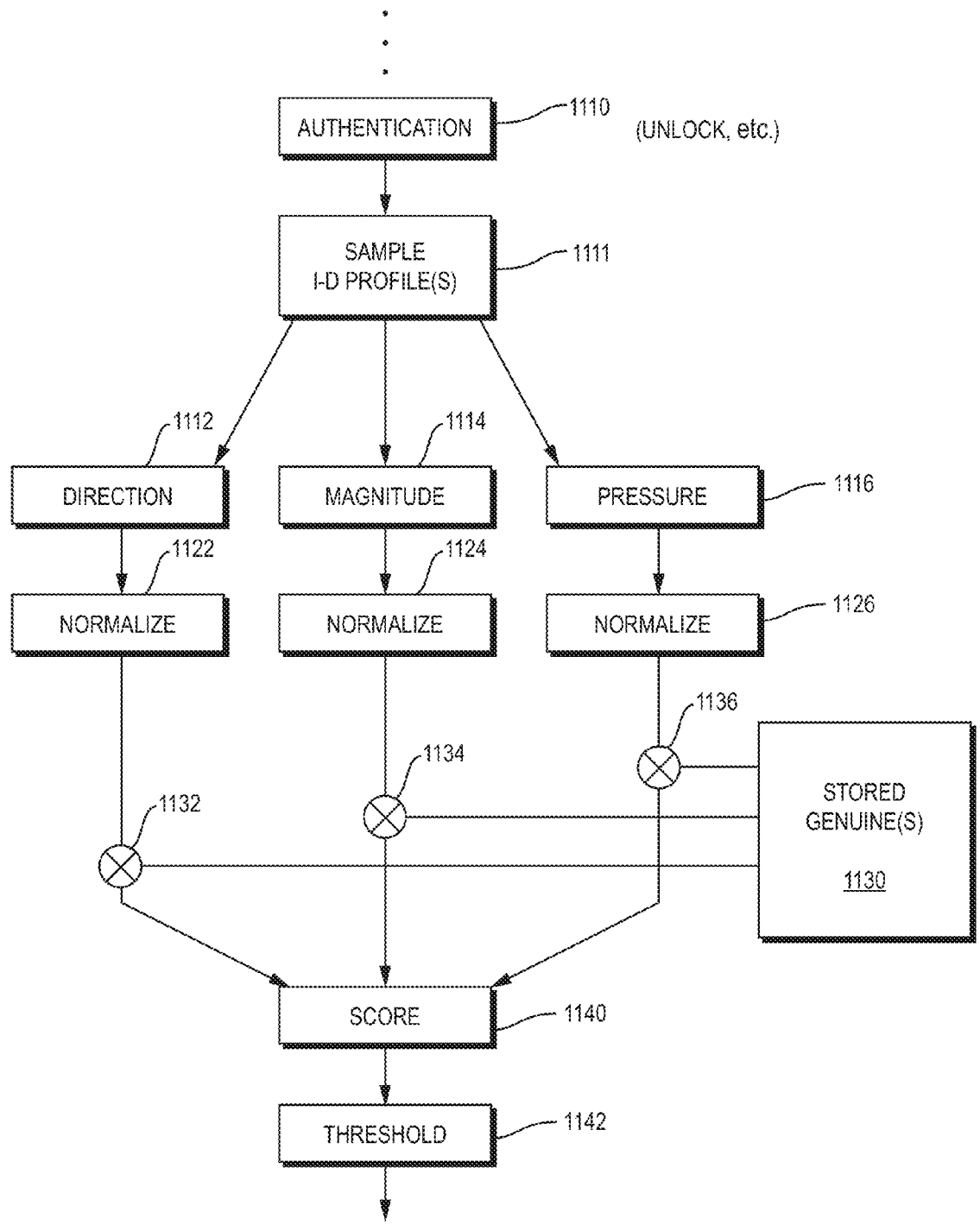
FIG. 11 is a typical sequence of operations performed to authenticate a habitual gesture via 1-D profiles taken from the sensor grid of FIG. 4.

A functional block diagram of the companion kinematic authentication algorithm is shown in FIG. 11. The input to the algorithm includes two (2) or more reference time series point sets (stored as the genuine signatures in state 914) and an unknown series detected from a present user. The algorithm uses raw reference data sets, and does not require training. The algorithm performs compensation for scaling and rotation on each of the point sets, and then compares the individual reference sets to the unknown producing an error value for each. The errors are combined into a single value which is compared to a standard deviation threshold for the known references, which produces a true/false match.

FIG. 11 shows one example method for kinematic signature feature extraction, normalization and comparison for use as biometric authentication (it will be understood that others are possible).

As shown in FIG. 11, a state 1110 is entered in which authentication of a current user of the device 110 is desired using the habitual gesture (kinematic) algorithm. This may be as part of an unlock sequence or some other state where authentication is needed. A next step 1111 is entered in which samples of the 1-D profiles are obtained per the techniques already described above. The 1-D profiles are then submitted to direction 1112, magnitude 1114, and pressure 1116 processing.

More particularly, step 1111 extracts features from the set of biometric point measurements. The direction component is isolated at state 1112 from each successive pair of points by using the arctangent of deltaX and deltaY resulting in a value within the range of −PI to +PI. This results in the direction component being normalized 1122 to within a range of 2*PI.

The magnitude component is extracted in state 1114 by computing the Euclidian distance of deltaX, deltaY and dividing by the sample rate to normalize it at state 1126. There may be other measurement values associated with each point such as pressure 1116, which is also extracted and normalized 1126.

The set of extracted, normalized feature values are then input to a comparison algorithm such as Dynamic Time Warping (DTW) or Hidden Markov Model for matching (1132, 1134, 1136) against a set of known genuine patterns 1130 for identification.

For signature verification, the normalized points are derived from a set of library data sets which are compared to another normalized set to determine a genuine set from a forgery. The purpose of normalization 1112, 1114, 1116 is to standardize the biometric signature data point comparison. Prior to normalization, the features are extracted from each pair of successive x, y points for magnitude 1114 and direction 1112. The magnitude value may be normalized as a fraction between 0.0 to 1.0 using the range of maximum and minimum as a denominator. The direction value may be computed as an arctangent in radians which is then normalized between 0.0 to 1.0. Other variations may include normalization of the swipe dynamics such as angle and pressure. The second order values for rate and direction may also be computed and normalized. The first order direction component isolates from scaling. A second order direction component will make it possible to make the data independent of orientation and rotation.

To verify, several genuine signatures are preferably used as a 'gold standard' reference set. First, the genuine reference set is input, extracted and normalized. Then each unknown scan is input, extracted and normalized and compared point by point against each signature in the genuine reference set.

To perform the signature pair comparison, a DTW N×M matrix may be generated by using the absolute difference between each corresponding point from the reference and one point from the unknown. The matrix starts at a lower left corner (0,0) and ends at the upper right corner. Once the DTW matrix is computed, a backtrace can be performed starting at the matrix upper right corner position and back-following the lowest value at each adjacent position (left, down or diagonal). Each back-position represents the index of matching position pairs in the two original point sets. The average of the absolute differences of each matching position pair is computed using the weighted recombination of the normalized features. This is a single value indicating a score 1140 as an aggregate amount of error between the signature pairs.

The range of each error score is analyzed and a precomputed threshold 1142 is used to determine the probability of an unknown signature being either a genuine or an outlier. The threshold value is determined by computing error values of genuine signatures against a mixed set of genuine signatures and forgeries. The error values are used to determine a receiver operating characteristic (ROC) curve which represents a probability of acceptance or rejection.

Figure 12:
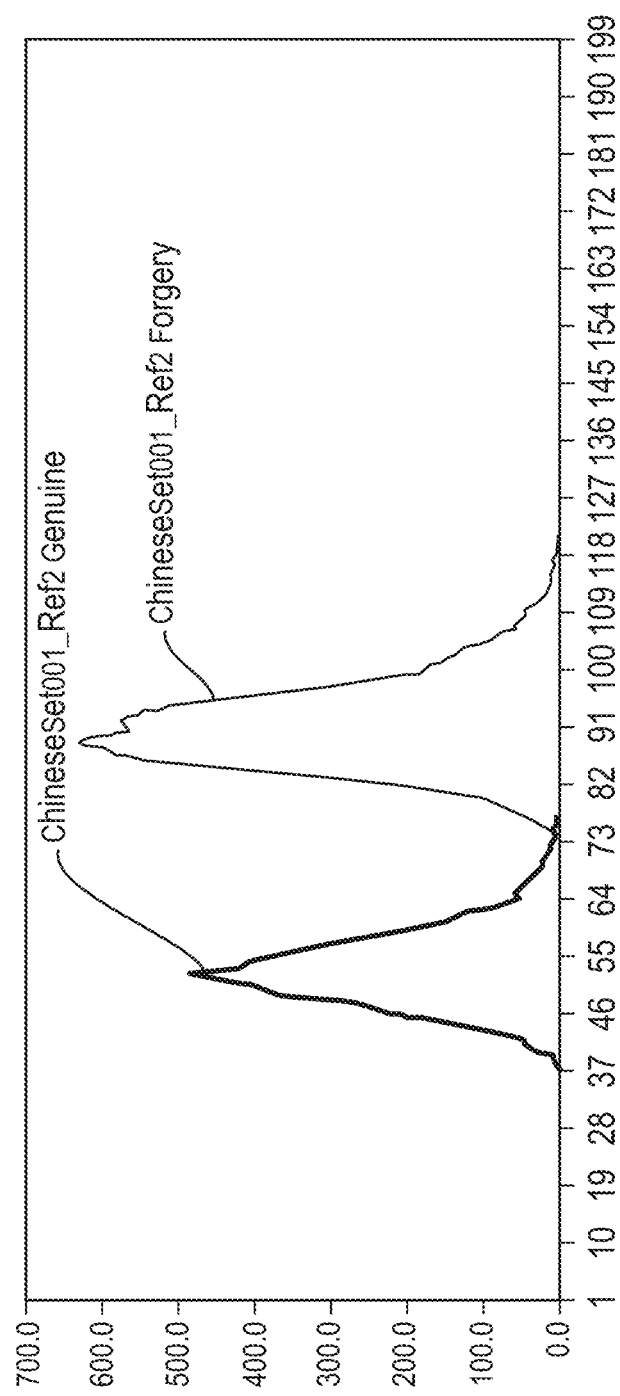
FIG. 12 is typical authentication decision for a detected habitual gesture.

The kinematic algorithm was implemented in a functional online demonstration. Signature collection was performed on an Apple™ iPad and interfaced to a server which contained the reference signatures and the authentication algorithm. In this set-up, signatures of several data bases were used with the most significant being the test data set from SigComp2011. Each individual supplied 24 genuine reference signatures with several skilled forger individuals providing an equal number or more of forgeries. The probability distribution for the set of Chinese signatures from person 001 (ChineseSet001) which has 24 genuine signatures and 36 forgeries, is depicted in FIG. 12. The peak on the left represents genuine signatures, and the peaks on the right represents forgeries. Excellent separation exists between distributions. The average Equal Error Rate (EER) for all genuine signatories was 1% using 14 reference signatures and 2.4% using only 2 reference signatures. This implies a better accuracy than the winner of the SigComp2011 competition who averaged greater than 3% on both False Accept and Reject (FAR/FRR).

E. Combining Epidermal and Kinematic Recognition/Fusion

In this approach, we authenticate a user by exploiting both their (1) habitual touchscreen gestures (as per FIG. 11) along with (2) the epidermal characteristics of their finger or "finger image" (as per FIG. 4).

The kinematic touchscreen gesture authentication algorithm exploits the biometric modality of habitual human motion in order to verify an individual who has previously registered their personal data movements. This modality is not in wide use and is extremely difficult to imitate because it contains motion timing that can only be replicated by skillful and intense observation.

In one implementation, the sparse resolution sampling of a projected capacitive touch screen can be used to uniquely identify a registered user from the 1-D profiles collected via the pro-cap sensor grid 110. As one example, the Neuromorphic Parallel Processing technology, such as that described in U.S. Pat. No. 8,401,297 incorporated by reference herein, may be used. Processing may be distributed at a network server level to fuse these different biometric modalities and provide another level of authentication fidelity to improve system performance. The aforementioned Neuromorphic Parallel Processor technology for multimodal fusion, specifically the fast neural emulator, can also be a hardware building block for a neuromorphic-based processor system. These mixed-mode analog/digital processors are fast neural emulators which convolve the synaptic weights with sensory data from the first layer, the image processor layer, to provide macro level neuron functionality. The fast neural emulator creates virtual neurons that enable unlimited connectivity and reprogrammability from one layer to another. The synaptic weights are stored in memory and output spikes are routed between layers.

Figure 13:
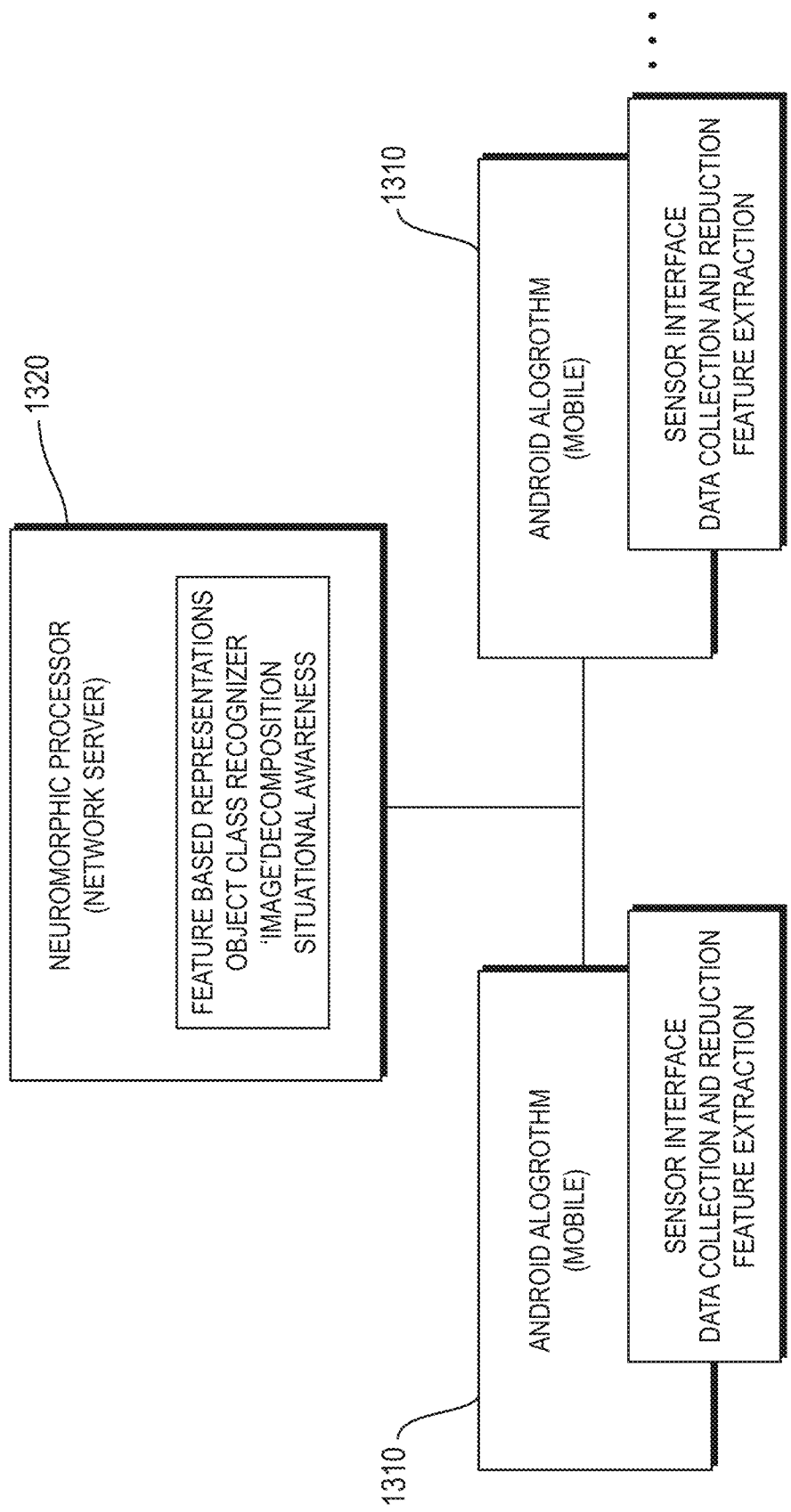
FIG. 13 is an active authentication processing architecture.

The preferred architecture follows the process flow of the active authentication application as per FIG. 13. A server application 1310 continues to validate the user—but resides as part of a network including the devices 110 at a server. This is where the higher layers of the neuromorphic processor can reside. The mobile platform 110 fuses touchscreen movement and finger 1-D profile data and provides 1310 an evaluation of the level of confidence using local pattern recognition algorithms, as described above.

Processing, identification and validation functionality 1310 may reside on the mobile platform 110 as much as possible. In order to accommodate potential commercial mobile platform microprocessor and memory constraints, a more flexible architecture is to allow the entire chain of pattern recognition and active authentication to be accomplished by the mobile device as shown in FIG. 13. The mobile device acquires touchscreen data from the pro-cap controller 111, reduces data for feature extraction, and provides the applicable 1-D profile data sets of the gesture and finger image for classification, recognition and authentication to the server. This architecture also minimizes the security level of software in the mobile platform.

Figure 14:
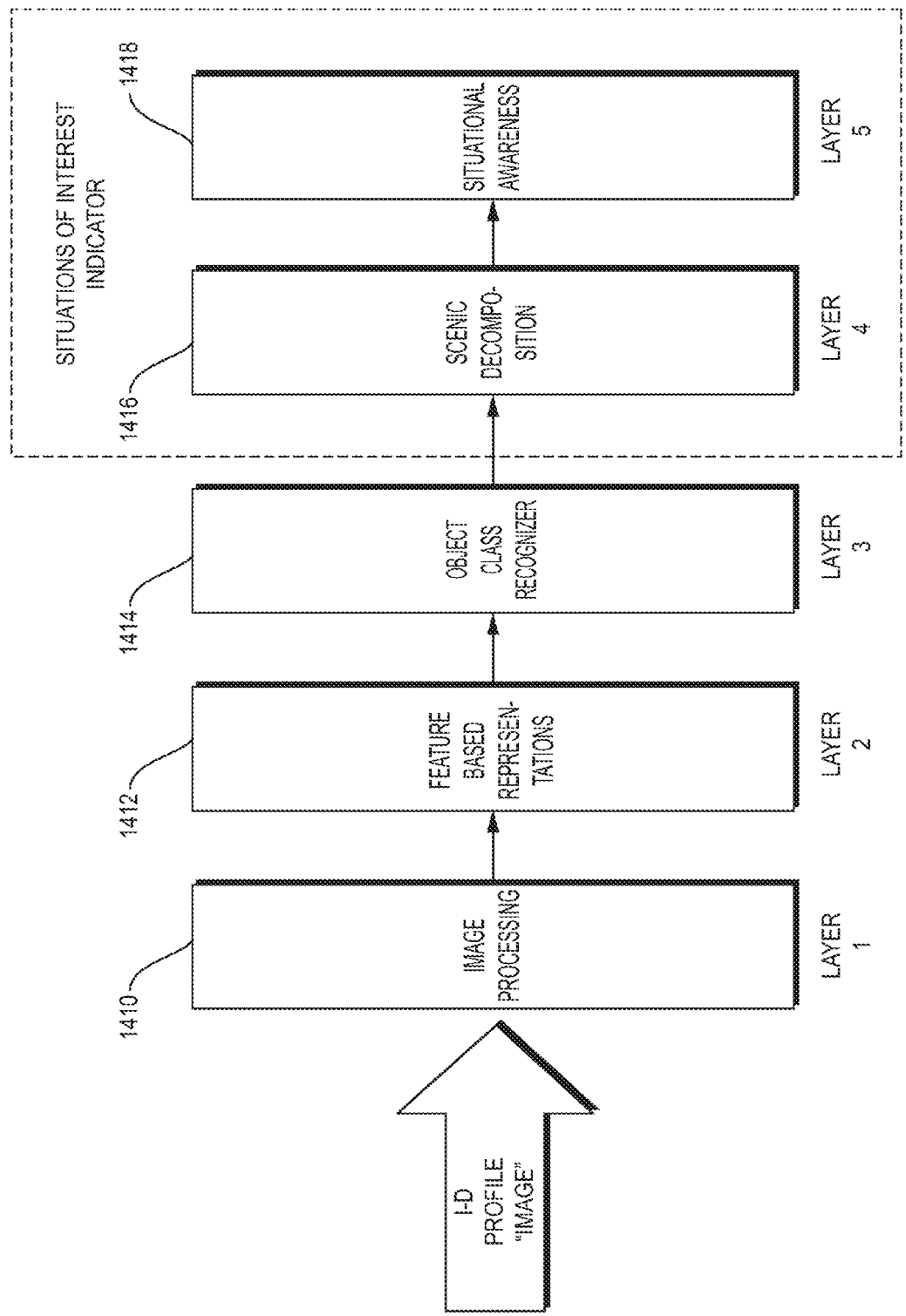
FIG. 14 is a more detailed view of a neuromorphic parallel processor that may be used to fuze results.

A functional block diagram of a stand alone neuromorphic processor which is optionally added to the device 110 and/or server is shown in FIG. 14. It has five (5) function layers. The processor contains components that are part of the first three layers. The first 1410 of these layers is an "image" processor. The second layer 1412 is populated with feature based representations of the 1-D profile objects such as finger 'images' or touchscreen habitual gesture, and is not unlike a universal dictionary of features. Here, the term 'images' is used to describe the multi-dimensional data set of 1-D profiles. The third layer 1414 is the object class recognizer layer, while the fourth and fifth layers are concerned with inferring the presence of situations of interest.

The design implementation of a five (5) layered neuromorphic parallel processor solution addresses the need for a low-power processor that can facilitate massive computational resources necessary for tasks such as scene understanding and comprehension. It is similar to that of a biological neuron with its mixed-mode analog/digital fast neural emulator processor capability where some key features are: Low Size, Weight and Power (SWaP), Low Loss, and Low Installation Complexity and Cost.

Figure 15:
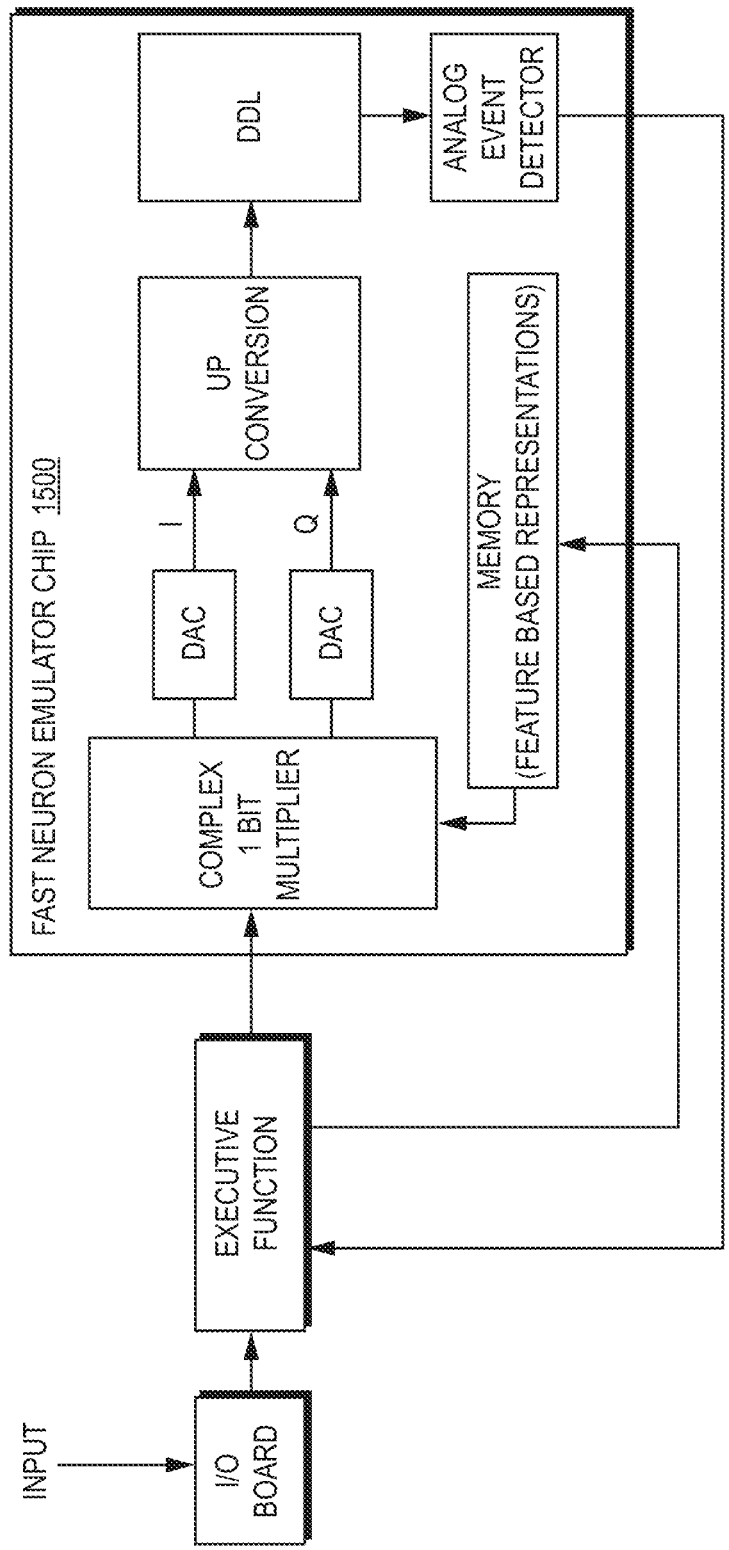
FIG. 15 is a more detailed view of one implementation of a fast neuron emulator.

One building block of the neuromorphic parallel processor can be a fast neuron emulator shown in FIG. 15. A convolution function is implemented by means of a chirp Fourier transform (CFT) where the matched chirp function is superimposed on the synaptic weights, which are convolved with the incoming data and fed into the dispersive delay line (DDL). If the synaptic weights are matched to the incoming data, then a compressed pulse is seen at the output of the dispersive delay line similar to the action potential in the neural axon. An executive function may control multiple (such as four (4)) fast neuron emulators 1500. The feature based representations are reduced dimensionality single bit complex representations of the original data.

The feature based representations of objects in the second layer 1414 of the neuromorphic parallel processor may be fused to obtain better performance when recognition of individual objects is the objective. Fusion of multimodal biometric data to achieve high confidence biometric recognition is used to illustrate the algorithm.

A biometric system can thus be divided into three (3) stages—

1. Feature extraction, in which the biometric signature is determined,

2. Matching, in which the degree of match between an unknown signature and an enrolled signature is determined, and 3. Decision, in which the determination of whether or not a match is made.

Our preferred approach is based on fusion at the matching stage. In this approach, separate feature extraction is performed on each biometric input and a score is independently developed regarding the confidence level that the extracted signature for each modality matches a particular stored (e.g., authenticated) biometric record. Then a statistical combination of separate modal scores is done based on the scores and the known degree of correlation between the biometric modalities.

The scores are weighted by the source data quality in both the enrollment and the captured image to give preference to higher quality capture data. If the modes are completely independent (such as habitual gesture and fingerprint terrain) the correlation is near zero and the mode scores are orthogonal resulting in maximum information in the combined score. If there is a correlation between the modes, the scores are not completely orthogonal, but neither are they coincident, allowing additional confidence information to be extracted from the orthogonal component.

The invention claimed is:

1. An apparatus comprising:
    a touchscreen having a touch sensor array comprising a capacitive wire grid providing a touch sensor output at each of a plurality of grid intersection points, a spacing between grid intersection points being greater than a spacing between ridges and valleys of a user's fingerprint terrain;
    a touchscreen controller, connected to the touchscreen and to sample the touch sensor outputs so that each sampled touch sensor output is representative of a difference in mutual capacitance between ridges and valleys of a portion of the fingerprint terrain of a finger of the user as that user's finger moves with respect to the grid intersection point, such that the touch sensor outputs, detected over time, provide a set of one-dimensional time-varying user profile signals representative of a portion of the user's fingerprint terrain;
a memory, for storing the set of user profile signals;
a processor, for reading the set of user profile signals and executing code to continuously authenticate the user, the code for:
authorizing the user via a user authorization task, by determining if the user is an authorized user by comparing the user profile signals against stored authorized user information representative of a fingerprint of an authorized user;
detecting, over time, additional user profile signals received from the touch sensor outputs as a result of the user interacting with the touchscreen while the user is performing tasks other than the user authorization task, each additional user profile signal comprising a one-dimensional time-varying signal representative of a difference in mutual capacitance between ridges and valleys of a different portion of the fingerprint terrain of the user, produced as the user's finger makes subsequent movements with respect to the grid intersection points; and
further determining if the user is an authorized user by comparing the stored authorized user information and the additional user profile signals.

2. The apparatus of claim 1 wherein the code is further for:
detecting one or more habitual touchscreen gestures from the additional user profile signals provided by the touch sensor array; and
further determining if the user is an authorized user by also comparing the habitual touchscreen gestures to one or more stored representations of habitual touchscreen gestures previously detected from the authorized user.

3. The apparatus of claim 1 wherein the code for determining if the user is an authorized user is executed as a continuous background process and the code is additionally for:
in response to determining that the user is an authorized user, continuing to detect, over time, additional profile signals received from the touch sensor outputs while the user is performing tasks other than the user authorization task, each additional profile signal comprising a one-dimensional time-varying signal representative of a difference in mutual capacitance between ridges and valleys of a fingerprint terrain of the current user, produced as the user's finger makes further subsequent movements with respect to the grid intersection points; and
further determining if the user is an authorized user by comparing the stored authorized user information and the additional profile signals.

4. The apparatus of claim 2 wherein the code is additionally for:
determining at least one of a direction, magnitude or pressure measurement from the user profile signals; and
normalizing the at least one direction, magnitude or pressure measurement.

5. The apparatus of claim 1 wherein the current user profile signals are representative of a rectangular strip portion of the current user's fingerprint.

6. The apparatus of claim 1 wherein the spacing between grid intersection points is at least ten times the spacing between ridges and valleys of a user's fingerprint terrain.

7. The apparatus of claim 1 wherein the spacing between grid intersection points is at least 0.25 inches.

8. A method comprising:
receiving touch sensor outputs, from a touchscreen having a touch sensor array comprising a capacitive wire grid providing outputs at each of a plurality of grid intersection points, each touch sensor output representative of a difference in mutual capacitance between ridges and valleys of a fingerprint terrain of a user as the user's finger moves with respect to the grid intersection point in response to a prompt to interact with the touchscreen, with a spacing between grid intersection points being greater than a spacing between ridges and valleys of a user's fingerprint terrain,
sampling the touch sensor outputs, over time, to detect ridges and valleys of the user's fingerprint terrain as the user's finger moves with respect to the wire grid thus providing a set of one-dimensional time-varying user profile signals representative of the user's fingerprint;
storing the set of user profile signals;
determining if the user is an authorized user by comparing the user profile signals against stored authorized user information;
detecting, over time, additional user profile signals received from the touch sensor outputs as a result of the user interacting with the touchscreen while the user is performing tasks other than determining if the user is an authorized user, each additional user profile signal comprising a one-dimensional time-varying signal representative of a difference in mutual capacitance between ridges and valleys of a different portion of the fingerprint terrain of the user, produced as the user's finger makes subsequent movements with respect to the grid intersection point; and
further determining if the current user is an authorized user by comparing the stored authorized user information and the additional user profile signals.

9. The method of claim 6 additionally comprising:
detecting one or more habitual touchscreen gestures from the additional profile signals provided by the touch sensor array; and
further determining if the user is an authorized user by also comparing the habitual touchscreen gestures to one or more stored representations of habitual touchscreen gestures previously detected from the user.

10. The method of claim 8 additionally comprising:
in response to determining that the user is an authorized user, executing a background process for continuing to detect, over time, additional profile signals received from the touch sensor outputs while the user is performing tasks other than the user authorizing step, each additional profile signal comprising a one-dimensional time-varying signal representative of a difference in mutual capacitance between ridges and valleys of a fingerprint terrain of the current user, produced as the user's finger makes subsequent movements with respect to the grid intersection point, and the background process continuing to determine if the user is an authorized user by comparing the stored authorized user information and the additional user profile signals.

11. The method of claim 8 additionally comprising;
determining at least one of a direction, magnitude or pressure measurement from the additional profile signals, and
normalizing the at least one direction, magnitude or pressure measurement.

12. The method of claim 8 wherein the user profile signals are representative of a rectangular strip portion of the user's fingerprint terrain.

13. The method of claim 8 wherein the spacing between grid intersection points is at least ten times the spacing between ridges and valleys of a user's fingerprint terrain.

14. The method of claim 8 wherein the spacing between grid intersection points is at least 0.25 inches.

\* \* \* \* \*